March 29, 1949.   C. R. S. SEARS ET AL   2,465,488
ROTARY TRASH CHOPPER
Filed March 23, 1944                         2 Sheets-Sheet 1
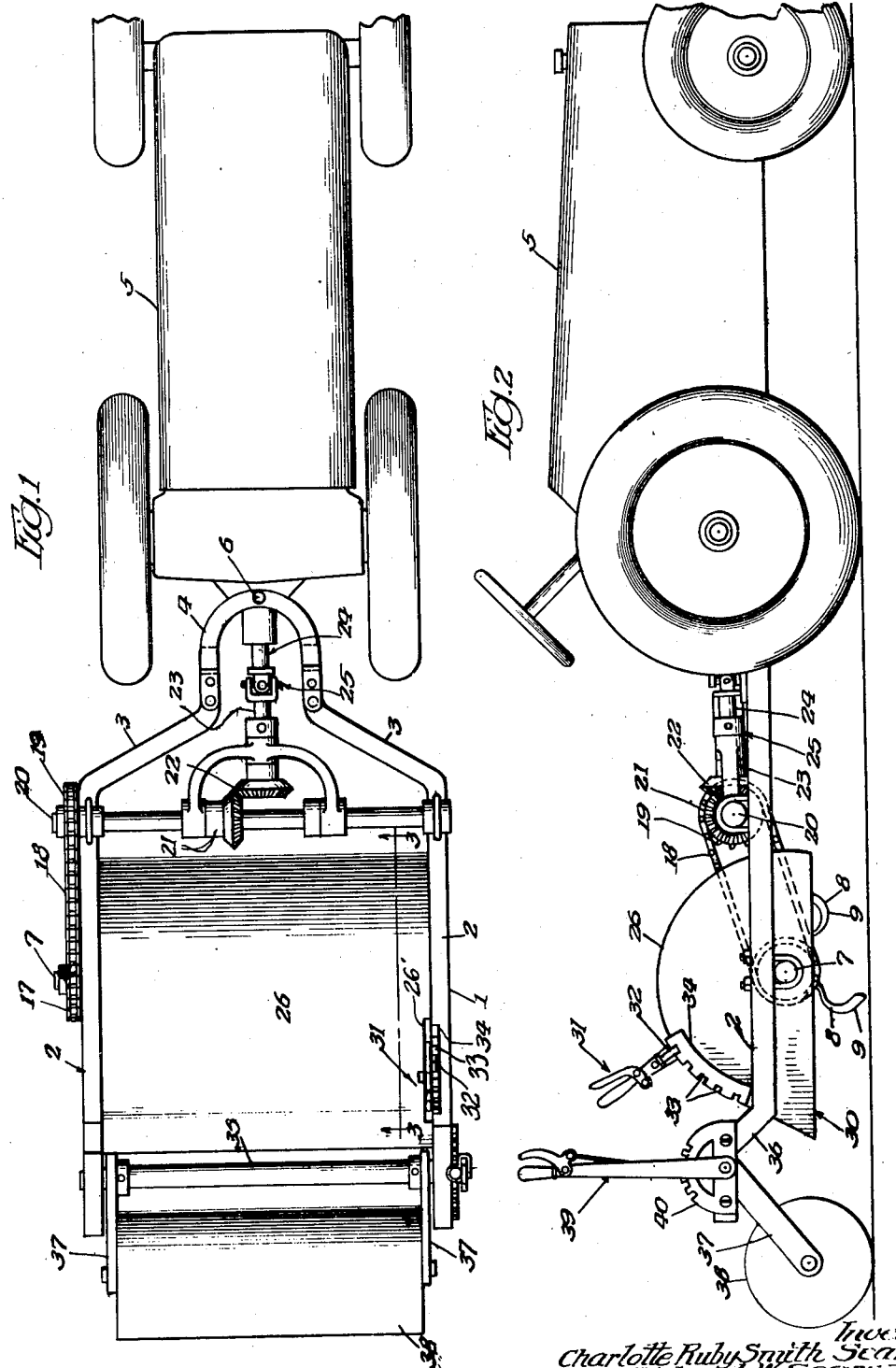
Inventors
Charlotte Ruby Smith Sears
and Richard W. Sears II,
By Spencer, Marzall, Johnston & Cook Attys

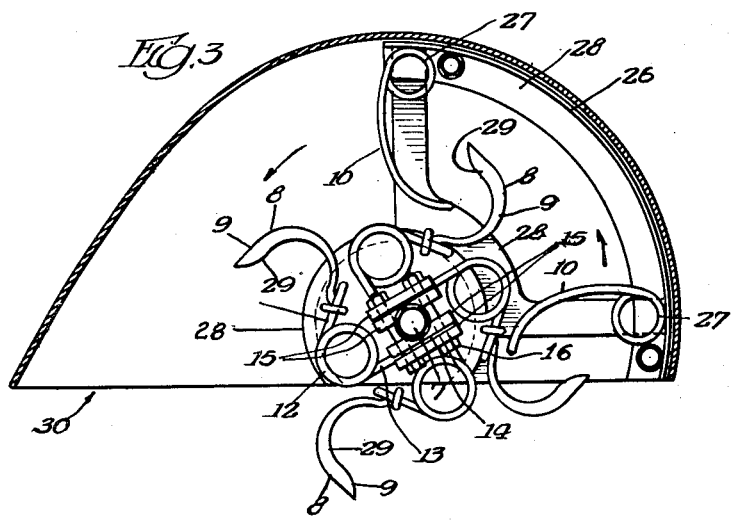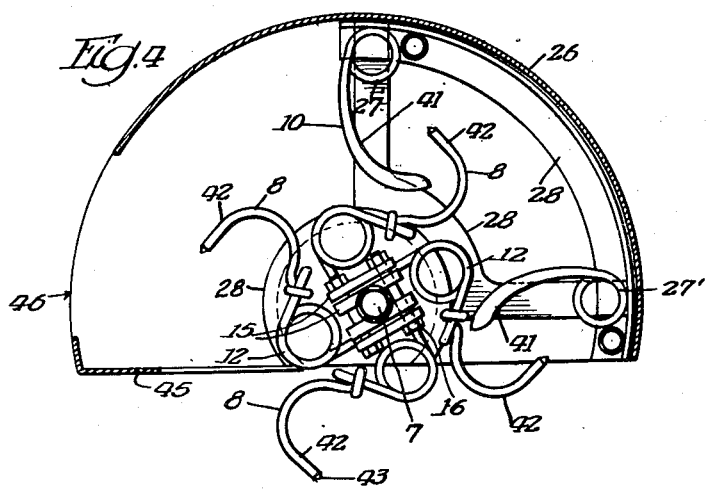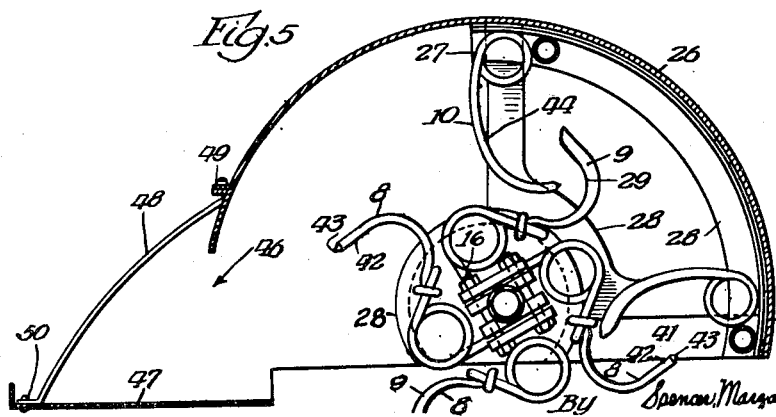

Patented Mar. 29, 1949

2,465,488

UNITED STATES PATENT OFFICE 2,465,488

ROTARY TRASH CHOPPER

Charlotte Ruby Smith Sears and Richard W. Sears, II, Evanston, Ill.

Application March 23, 1944, Serial No. 527,738

6 Claims. (Cl. 55—118)

This invention relates to a farming implement, and its primary object is the provision of a new and improved implement for cutting up surface trash to make the same more manageable for use as fertilizer on soil.

Another important object of the invention is the provision of a new and improved implement embodying a plurality of cutting elements adapted for co-operation with other elements which provide a fulcrum for the cutting elements, so as to destroy surface trash and shred the trash to make it manageable for proper distribution with respect to the soil so as to fertilize the soil.

A further important object of the invention is the provision of a single farming implement for picking up and shredding material such as green manure, surface trash and residue, and distributing the shredded material on the soil for fertilizing purposes.

Still another object of the invention resides in the provision of a plurality of rotating elements which co-operate with other elements to effect a cutting action, the rotating elements having resilient characteristics and being eccentrically mounted so that the operating position may be shifted.

Numerous other objects and advantages will be apparent throughout the progress of the following specification.

The accompanying drawings illustrate certain selected embodiments of the invention, and the views therein are as follows:

Fig. 1 is a detail plan view of the improved farming implement showing the same operatively connected to a tractor;

Fig. 2 is a detail side elevational view;

Fig. 3 is a detail sectional view on the line 3—3 of Fig. 1;

Fig. 4 is a view similar to Fig. 3, but showing a modified form of hood with a different knife and tine arrangement; and Fig. 5 is a view similar to Figs. 3 and 4, but showing a different modified form of hood with an alternate tine and knife arrangement.

The particular farming implement herein shown for the purpose of illustrating the invention comprises a frame 1, Figs. 1 and 2, having oppositely disposed side bars 2, the forward ends of which converge inwardly, as indicated at 3, the converging ends 3 being connected by a yoke 4. The frame 1 is adapted to be power driven by a prime mover 5, which in the present instance is shown as being a conventional tractor. The implement may be propelled by the tractor 5 by means of a disconnectible pin or clevis 6 for detachably fastening the frame to the tractor.

A transverse driven shaft 7 is mounted in suitable bearings in the side bars 2 and carries a plurality or series of disconnectible implements or elements 8, which may be in the form of knife elements 9, and co-operate with a plurality or series of fixed elements 10, Fig. 3, which act as fulcrums for the knives so as properly to sever the trash in shredded form.

The elements 8 are disconnectibly fastened to the ends 11 of attaching members 12 which comprise coil springs. The opposite free ends 13 of the attaching members 12 may be flattened, as indicated at 14, Fig. 3, and mounted between spaced plates or blocks 15, whereby the attaching members may be shifted radially with respect to the shaft 7 to effect the adjustment required or desired. Bolts 16 pass through the plates or blocks 15 and lock the attaching members 12 securely to the transverse shaft 7, which is preferably provided with non-circular portions where the assembly is to be locked to the shaft.

The shaft 7 has a sprocket wheel 17 fixed thereto, which is driven by a chain 18 passing over a sprocket 19 on a second driven shaft 20. A bevel gear 21 fixed to the shaft 20 meshes with an inter-meshing bevel gear 22 on the longitudinal driven shaft 23, Fig. 1. The shaft 23 may be driven by a power take-off 24 of the tractor 5 by means of a driving connection or clevis arrangement 25. The tractor 5, therefore, not only propels the implement but also provides a source of power for rotating the elements 8. Power from the tractor 5 therefore drives the shaft 7 and the implements 8 in a counterclockwise direction, as indicated by the directional arrows in Fig. 3.

The co-operating elements 10 are circumferentially arranged about the inside of a hood or housing 26 which houses or covers the driven implements 8 which are propelled by the driven shaft 7. These elements 10 may include a springy or resilient part 27 and are fastened to a shiftable supporting bracket 28. The bracket 28 is eccentrically mounted upon and shiftable about the shaft 7 and is arranged inside of the hood or housing 26. The elements 10 co-operate with the implements 8 for causing surface trash, green manure, and such other fertilizer as may be on the top of the soil, properly to be cut up and shredded and then distributed on the surface of the ground.

The implements 8, 9, which are relatively hook-shaped, are indicated as having relatively sharp cutting edges 29, Fig. 3. The elements 8, 9, may also be relatively sharp pointed, as shown, and are for the purpose of carrying surface trash and other material upwardly into the hood and into engagement with the elements 10, whereupon the knife edges 29 will cut and shred the material. The shaft 7 is adapted to rotate at a relatively high speed and, therefore, the material which is picked up from the ground by the implements 8 is cut and discharged out of the rear end 30 of the hood or housing 26. Fast rotation of the elements 9 not only acts as a conveyor and a cutter, but also has a certain blower effect, thereby definitely insuring that the material picked up by the implements or elements 8 will be shredded and discharged out of the rear end 30 of the housing.

The attaching members 12 for the elements 9 are adapted for adjustment so as to obtain the proper relative position of the implements 8 with respect to their corresponding elements 10 and the inside surface of the hood or housing 26. Also, the backing or fulcrum-acting elements 10 are adjustable with respect to the elements 8 because of the shiftable mounting of the supporting brackets 28, whereby there is effected proper co-operation of the rotating elements or implements 8 and the stationary elements 10. The elements 8 and 10 each may have spring mountings, as shown, so as to prevent damage which would likely result should relatively large pieces of material be picked up by the members 8, or should the implement be used in stony or rocky soil.

The housing 26 may be supported in any conventional manner, such as by attachment to a part of the implement frame, and the bracket 28 may be eccentrically shifted within the housing 26 by means of a shifting lever 31 secured to the bracket 28. The shifting lever 31 includes a locking bar 32 which is adapted to fit into spaced notches 33 formed in a plate 34 on the hood 26. Eccentric shifting of the bracket 28 is therefore effected by merely shifting the lever 31. The bracket 28 is maintained in its shifted position when the locking bar 32 on the lever 31 is received in a proper notch 33. The elements 10, while resiliently mounted, are normally stationary. However, they are adapted to be adjustably mounted on the brackets 28. It is preferable that there be two sets of stationary elements 10 with respect to one set of rotary elements 8 so that the material as it is picked up will be chopped between the elements 8 extending between pairs of stationary elements 10. However, there may be one set of elements 10 for each two sets of elements 8. The elements 8 are spaced apart transversely and are adapted to receive trash and carry the trash up to the elements 10 where it is cut. In any instance, however, there are a plurality of elements 10 spaced axially which cooperate with a plurality of axially spaced cutting elements.

A transverse bar or shaft 35 may be operatively supported by extensions 36 on the side bars 2, and parallel supports 37 may be operatively fastened to the transverse shaft 35 to support a rearwardly disposed roller 38. Operating lever mechanism indicated generally by the numeral 39 co-operates with a segment rack 40 to effect raising and lowering of the frame 1, whereby vertical adjustment of the implements 10 may be maintained.

During operation, and after the bracket 28 is in the proper desired position, and the lever mechanism 39 is adjusted, and the shaft 7 is rotating while being translated, the implements 8 will pick up surface trash and carry it into the housing 26 where it will be chopped up and shredded by the element or implement knives 8, 9 as the trash engages the elements 10. The elements 10 act as a backing or fulcrum with which the cutting knives 9 on the element 8 cooperate. The material picked up by the members 8 in co-operation with the members 10 is cut by the knife edges 29, after which time the chopped or shredded material is conveyed to the rearward part of the housing and is expelled out of the discharge end 30. The implements 8 are also adapted to dig into the soil to cultivate the upper surface of the soil, the depth of soil penetration depending upon the adjustable setting provided.

The elements 8 and 10 may have their positions reversed, if desired, as shown in Fig. 4, or they may be arranged in alternate position, as shown in Fig. 5. The invention contemplates the distribution or arrangement of the elements 8 and 10 as desired or required.

The elements 10 are shown in Fig. 4 as being provided with sharp cutting edges 41, whereupon the elements 10 act as knives or shearing elements which co-operate with the elements 8 which are merely in the form of pick-up tines 42. The tines 42, Fig. 4, which may be relatively sharp pointed as indicated at 43, may act merely as pick-up and conveyor elements for forcing the surface trash, green manure, or other debris through the knife edges 41 to effect the cutting operation.

In Fig. 5 the elements 10 may be arranged in series of either knives 41 or co-operating fulcrum elements 44, and the elements 8 may comprise alternate tine conveying members 42 or knives 9 having sharp cutting edges 29.

In some instances it may be desirable and practical to cover the bottom rear end of the housing 26 with a plate 45 and provide a rear expelling or discharge opening 46, Fig. 4. The housing 26 may also be constructed in the manner shown in Fig. 5, wherein the lower rear edge of the housing is cut away to provide a discharge opening 46 for discharging the shredded material on a pan or other receptacle 47. The pan 47 may be made removable and may be supported by suitable brackets 48. The brackets 48 may be connected to the hood or housing, as indicated at 49, Fig. 5, and the receptacle 47 may be fastened to the lower end of the brackets 48, as indicated at 50, Fig. 5. Should the receptacle construction 47 be employed, it may be desirable to employ some auxiliary mechanism for continuously sweeping, brushing or otherwise expelling the shredded or chopped material from the pan 47.

The farming implement herein described not only contemplates the picking up and shredding of a quantity of surface trash or other surface material, but also includes means for operating on or into the soil. Such material which is not picked up and shredded is worked into the soil, thereby causing the soil to be fertilized. The implement acts on a quantity of trash so as to pick up and shred a portion of the surface trash and simultaneously incorporate another portion of the surface trash with the soil. The members or elements 8 pick up some of the trash and deliver it to the members or elements 10 where it is shredded. The shredded material is then discharged out of the hood 26 onto the soil or otherwise discharged to a predetermined location, such as on the receptacle 47, Fig. 5, where it may be distributed by auxiliary means, not shown. Material on the ground, which is not picked up by the members or elements 8, is incorporated into the soil by the action of those elements, in contact with the soil or by penetration of the soil. The working-in of the material, which is not picked up, also provides for soil fertilization. Of course, the shredded material which is capable of being distributed on the soil is likewise for soil fertilization.

The surface trash herein referred to may be corn stalks or other debris, green manure, or any other substance capable for use as a fertilizer, whether the substance be applied purposely on the soil or otherwise, and the term hereby employed is to be applied in the broadest sense.

The invention provides a farming implement which is extremely efficient in use in that it causes all surface trash to be conveyed to cutters where it is shredded and chopped to make it more manageable in soil cultivation. Also, the invention provides an implement which will shred and chop positively the surface trash and debris and re-deposit it in shredded form on top of the soil where it acts as a fertilizer. If desired, the implements 8 may be set so as to engage and dig into the soil a predetermined distance to effect soil cultivation. The invention also contemplates means for varying the relative position of the implements 8 with respect to the implements 10 regardless of whether the implements 8 or 10 are shifted. The implement is constructed of durable material so as to withstand the usage intended, and the spring mounting of the elements 8 and 10 prevents breakage when the implement is used in extremely hard or rocky material. The spring mounting also relieves the mechanism from severe shocks and is capable for use on any type of soil. The elements 8 and 10, whether they be in the form of tines or knives, cause definitely the material to be thoroughly chopped up and shredded without mixing the trash with the soil, a condition which would not exist if the elements 8 were to operate on the trash against the ground instead of against the fulcrum elements herein provided. The shiftable mountings of the elements 8 and 10 are such that these elements may be shifted out of gear, that is, the shifting may be such that the elements 8 and 10 may be moved out of mutual co-operation.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A farming implement for picking up and shredding surface trash, embodying a series of rotary driven elements for picking up trash at the front and delivering said trash, when chopped, to a predetermined location rearwardly of the implement, a series of co-operating stationary elements co-operating with the first named series of elements and acting as fulcrums for the co-operating series of elements, some of said elements having cutting edges, and eccentric shiftable means operatively connected to one series of said elements to shift them eccentrically with respect to the other series of elements.

2. A farming implement for picking up and shredding material and comprising a support, a plurality of normally stationary elements mounted resiliently on said support, and a plurality of rotary resiliently mounted ground engaging elements arranged for co-operation with respect to the other elements, some of said elements having cutting edges, said rotary elements picking up the material directly from the ground and delivering it to the stationary elements to be cut by said cutting edges.

3. A farming implement for picking up and shredding material and comprising a support, a plurality of normally stationary elements mounted resiliently on said support, a plurality of rotary resiliently mounted ground engaging elements arranged for co-operation with respect to the other elements, some of said elements having cutting edges, and means to rotate said rotary mounted elements, said rotary elements picking up the material directly from the ground and delivering it to the stationary elements to be cut thereby.

4. A farming implement for picking up material lying on the surface of soil and delivering said material to position to be cut or shredded, said implement adapted to be propelled along the ground and embodying a frame, a shaft mounted in the frame, a plurality of adjustably mounted resilient rotary elements on the shaft for picking up the material from the ground and delivering it to a predetermined position, normally stationary elements adapted for co-operation with the rotary elements and acting as fulcrums therefor, some of said elements having cutting edges, means to rotate the shaft upon which the rotary mounted elements are mounted when the implement is propelled, means to raise and lower the frame to adjust the rotary elements with respect to their position relative to the soil surface, and additional means between the shaft and the rotary elements to adjust some of said elements with respect to said shaft, said rotary elements picking up the material on the front side and delivering it to the stationary elements to be cut and then discharging the cut material at the rear side.

5. A farm implement embodying a plurality of rotatable elements acting as pick-up members, means for rotating said elements, normally stationary elements co-operating with the pick-up members and acting as fulcrums therefor, means mounting the last said elements for adjustment circumferentially with respect to the axis of rotation of the pick-up members, some of said elements having cutting edges whereby material picked up by the pick-up members is chopped when brought into engagement with the normally stationary members, and resilient means individual to all of said members for securing them to their support.

6. A farm implement embodying a plurality of rotatable elements acting as pick-up members, means for rotating said elements, normally stationary elements co-operating with the pick-up members and acting as fulcrums therefor, means mounting the last said elements for adjustment circumferentially with respect to the axis of rotation of the pick-up members, some of said elements having cutting edges whereby material picked up by the pick-up members is chopped when brought into engagement with the movable stationary members, resilient means individual to all of said members for securing them to their support, and adjustably mounted roller means disposed rearwardly of said elements, and means mounting said roller for adjustment with respect to the implement.

CHARLOTTE RUBY SMITH SEARS.
RICHARD W. SEARS, II.

REFERENCES CITED

The following references are of record in the file of this patent:

UNITED STATES PATENTS

| Number | Name | Date |
|---|---|---|
| 190,118 | Brower | May 1, 1877 |
| 196,617 | Adams | Oct. 30, 1877 |
| 202,531 | Forlow | Apr. 16, 1878 |
| 373,370 | Johnson | Nov. 15, 1887 |
| 375,741 | Gilmore | Jan. 3, 1888 |
| 1,883,694 | Goble | Oct. 18, 1932 |
| 2,214,702 | Seaman | Sept. 10, 1940 |
| 2,359,472 | Fiese | Oct. 3, 1944 |